United States Patent [19]

Fukui

[11] Patent Number: 5,052,358
[45] Date of Patent: Oct. 1, 1991

[54] CYLINDER RECOGNITION APPARATUS FOR AN INTERNAL COMBUSTION ENGINE

[75] Inventor: Wataru Fukui, Himeji, Japan

[73] Assignee: Mitsubishi Denki Kabushiki Kaisha, Tokyo, Japan

[21] Appl. No.: 585,469

[22] Filed: Sep. 20, 1990

[30] Foreign Application Priority Data

Sep. 29, 1989 [JP] Japan .................. 1-252080

[51] Int. Cl.$^5$ .............................. F02P 7/06
[52] U.S. Cl. ................... 123/414; 123/613; 123/643
[58] Field of Search ............ 123/414, 613, 617, 643

[56] References Cited

U.S. PATENT DOCUMENTS

| 4,483,293 | 11/1984 | Akasu | 123/414 |
| 4,519,362 | 5/1985 | Arakawa et al. | 123/414 |
| 4,932,388 | 6/1990 | Chiba et al. | 123/613 |

FOREIGN PATENT DOCUMENTS 28314  6/1987  Japan.
36153  8/1987  Japan.

Primary Examiner—Tony M. Argenbright
Attorney, Agent, or Firm—Sughrue, Mion, Zinn, Macpeak and Seas

[57] ABSTRACT

A cylinder recognition apparatus for a multi-cylinder internal combustion engine capable of recognizing a specific reference cylinder as well as the remaining cylinders of the engine by use of only a single signal. A signal generator generates a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder. A microcomputer discriminates the cylinder recognition pulse among the signal generator output pulses so as to recognize the specific positional pulse corresponding to the speicfic cylinder. The microcomputer calculates the pulse width of each pulse in the signal generator output signal and the pulse interval between the rising or falling edges of successive pulses, calculates the ratio of the pulse width to the pulse interval for each pulse, and discriminates the cylinder recognition pulse based on the ratio thus obtained.

18 Claims, 4 Drawing Sheets 5,052,358

CYLINDER RECOGNITION APPARATUS FOR AN INTERNAL COMBUSTION ENGINE

BACKGROUND OF THE INVENTION

The present invention relates to a cylinder recongnition apparatus for a multi-cylinder internal combustion engine which can recognize the operating condition or rotational position of each engine cylinder based on the output signals from a signal generator.

In order for a multi-cylinder internal combustion engine to properly operate, fuel injection, ignition and the like for each cylinder must take place at prescribed rotational positions or angles of the crankshaft of the engine, i.e., at the times when each piston of the engine is at prescribed positions with respect to top dead center. For this reason, an engine is equipped with a rotational position sensor such as a signal generator which senses the rotational angle or position of the crankshaft of the engine.

FIG. 4 illustrates, in a block diagram, a conventional cylinder recognition apparatus for a multi-cylinder internal combustion engine. The cylinder recognition apparatus includes a signal generator 8 which generates a positional signal L including a plurality of positional pulses corresponding to the respective cylinders of the engine, an interface circuit 9, and a microcomputer 10 which receives the positional signal L from the signal generator 8 through the interface circuit 9 and recognizes, based thereon, the operating condition (i.e., crank angle or rotational position) of each cylinder.

A typical example of such a signal generator 8 is illustrated in FIG. 5. In this figure, the signal generator 8 illustrated includes a rotating plate 2 mounted on a rotating shaft 1 (such as the distributor shaft) which rotates in synchrony with the crankshaft of the engine. The rotating plate 2 has a set of first slits 3a formed in it at prescribed locations. The slits 3a are disposed at equal intervals in the circumferential direction of the rotating plate 2. The slits 3a, which are equal in number to the cylinders, are disposed so as to correspond to prescribed rotational angles of the crankshaft and thus to prescribed positions of each piston with respect to top dead center for sensing when the crankshaft reaches a prescribed rotational position for each cylinder. Another or second slit 3b is formed in the rotating plate 2 adjacent one of the first slits 3a at a location radially inwardly thereof for sensing when the crankshaft rotational angle is such that the piston of a specific reference cylinder is in a prescribed position.

A first and a second light emitting diode 4a, 4b are disposed on one side of the rotating plate 2 on a first outer circle and a second inner circle, respectively, on which the outer slits 3a and the inner slits 3b are respectively disposed. A first and a second light sensor 5a, 5b each in the form of a photodiode are disposed on the other side of the rotating plate 2 in alignment with the first and the second light emitting diode 4a, 4b, respectively. The first light sensor 5a generates an output signal each time one of the outer slits 3a passes between the first light sensor 5a and the first light emitting diode 4a. Also, the second light sensor 5b generates an output signal each time the inner slit 3b passes between the second light sensor 5b and the second light emitting diode 4b. As shown in FIG. 6, the outputs of the first and second light sensors 5a, 5b are input to the input terminals of corresponding amplifiers 6a, 6b each of which has the output terminal coupled to the base of a corresponding output transistor 7a or 7b which has the open collector coupled to the interface circuit 9 (FIG. 4) and the emitter grounded.

Now, the operation of the above-described conventional cylinder recognition apparatus as illustrated in FIGS. 4 through 6 will be described in detail with particular reference to FIG. 7 which illustrates the waveforms of the output signals of the first and second light sensors 5a, 5b.

As the engine is operated to run, the rotating shaft 1 operatively connected with the crankshaft (not shown) is rotated together with the rotating plate 2 fixedly mounted thereon so that the first and second light sensors 5a, 5b of the signal generator 8 generate a first and a second signal $L_1$, $L_2$ each in the form of a square pulse. The first signal $L_1$ is a crank angle signal called an SGT signal and has a rising edge corresponding to the leading edge of one of the outer slits 3a (i.e., a first prescribed crank angle or position of a corresponding piston) and a falling edge corresponding to the trailing edge thereof (i.e., a second prescribed crank angle of the corresponding piston). In the illustrated example, each square pulse of the SGT signal $L_1$ rises at the crank angle of 75 degrees before top dead center (a first reference position B75 degrees) of each piston, and falls at the crank angle of 5 degrees before top dead center (a second reference position B5 degrees).

The second signal $L_2$ is a cylinder recognition signal called an SGC signal, and has a rising edge corresponding to the leading edge of the inner slit 3b and a falling edge corresponding to the trailing edge thereof. The SGC signal $L_2$ is issued substantially simultaneously with the issuance of an SGT signal pulse corresponding to the specific reference cylinder #1 so as to identify the same. To this end, the inner slit 3b is designed such that it has a leading edge which corresponds to a crank angle before the first reference angle of the corresponding SGT signal pulse (i.e., a crank angle greater than 75 degrees before TDC), and a trailing edge corresponding to a crank angle after the second reference angle of the corresponding SGT signal pulse (i.e., a crank angle smaller than 5 degrees before TDC). Thus, actually, the rising edge of an SGC signal pulse occurs before that of a corresponding SGT signal pulse, and the falling edge of the SGC signal pulse occurs after that of the corresponding SGT signal pulse.

The two kinds of first and second signals $L_1$, $L_2$ thus obtained are input via the interface circuit 9 to the microcomputer 10 which recognizes the specific reference cylinder #1 based on the second signal $L_2$, and the operational positions (i.e., crank angles or rotational positions) of the remaining cylinders #2 through #4 based on the first signal $L_1$, whereby various engine operations such as ignition timings, fuel injection timings, etc., are properly controlled.

With the conventional cylinder recognition apparatus for a multi-cylinder internal combustion engine as described above, however, two pairs of light emitting diodes 4a, 4b and light sensors 5a, 5b are required for generating two kinds of output signals $L_1$, $L_2$ including the crank angle reference signal SGT and the cylinder recognition signal SGC. As a result, there arises the problem that the overall construction of the cylinder recognition apparatus becomes complicated, thus increasing the manufacturing cost thereof.

SUMMARY OF THE INVENTION

Accordingly, the present invention is intended to obviate the above-described problem of the conventional cylinder recognition apparatus.

An object of the present invention is to provide a novel and improved cylinder recognition apparatus for a multi-cylinder internal combustion engine which is able to recognize a specific cylinder as well as the remaining cylinders by use of only a single output signal of a signal generator.

Another object of the present invention is to provide a novel and improved cylinder recognition apparatus for a multi-cylinder internal combustion engine which is able to be manufactured at low costs.

A further object of the present invention is to provide a novel and improved signal generator suitable for use with a cylinder recognition apparatus which is simple in construction and which generates a single output signal including a plurality of first pulses each representative of prescribed rotational positions of a corresponding cylinder, and a second pulse for recognition of a specific cylinder.

In order to achieve the above objects, according to one aspect of the present invention, there is provided a cylinder recognition apparatus for a multi-cylinder internal combustion engine comprising:

a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder; and cylinder recognition means for discriminating the cylinder recognition pulse among the pulses contained in the output signal of the signal generator so as to recognize the specific positional pulse corresponding to the specific cylinder.

Preferably, the positional pulses in the signal generator output signal are square pulses having substantially the same pulse width, each of the positional signals having a rising and a falling edge which correspond to a first and a second rotational position, respectively, of a corresponding cylinder.

Preferably, the cylinder recognition pulse in the signal generator output signal is a square pulse having a rising edge and a falling edge, the cylinder recognition pulse having a pulse width less than that of the positional pulses.

In one embodiment, the cylinder recognition pulse in the signal generator output signal follows the specific positional pulse.

In another embodiment, the cylinder recognition pulse in the signal generator output signal precedes the specific positional pulse.

Preferably, the cylinder recognition means calculates the pulse width of each pulse in the signal generator output signal and the pulse interval between the rising or falling edges of successive pulses, calculates the ratio of the pulse width to the pulse interval for each pulse, and discriminates the cylinder recognition pulse based on the ratio thus obtained.

In one form, the cylinder recognition means calculates the pulse width $t_n$ of each pulse in the signal generator output signal and the pulse interval $T_n$ between the rising or falling edges of successive pulses, calculates the ratio $(t/T)_n$ of the pulse width $t_n$ to the pulse interval $T_n$ for each pulse and the difference between the present ratio $(t/T)_n$ for the present pulse and the preceding ratio $(t/T)_{n-1}$ for the preceding pulse, compares the absolute value of the difference $(t/T)_n - (t/T)_{n-1}$ with a prescribed reference value $\alpha$, and determines the present pulse to be the cylinder recognition pulse if $(t/T)_n - (t/T)_{n-1} > \alpha$.

The present ratio $(t/T)_n$ may be substituted for by the present ratio $[t/(T-t)]_n$ of the pulse width $t_n$ to the difference $(T-t)_n$ between the pulse interval $T_n$ and the pulse width $t_n$ for the present pulse, and the preceding ratio $(t/T)_{n-1}$ may be substituted for by the preceding ratio $[t/(T-t)]_{n-1}$ of the pulse width $t_{n-1}$ to the difference $(T-t)_{n-1}$ between the pulse interval $T_{n-1}$ and the pulse width $t_{n-1}$ for the preceding pulse.

In another form, the cylinder recognition means calculates the pulse width $t_n$ of each pulse in the signal generator output signal and the pulse interval $T_n$ between the rising or falling edges of successive pulses, calculates the ratio $(t/T)_n$ of the pulse width $t_n$ to the pulse interval $T_n$ for each pulse, compares the ratio $(t/T)_n$ with a prescribed reference value $\beta$, and determines a pulse to be the cylinder recognition pulse if the ratio $(t/T)_n$ for the pulse $< \beta$.

The ratio $(t/T)_n$ may be substituted for by the ratio $[t/(T-t)]_n$ of the pulse width $t_n$ to the difference $(T-t)_n$ between the pulse interval $T_n$ and the pulse width $t_n$ for each pulse.

According to another aspect of the present invention, there is provided a signal generator comprising:

a rotating shaft;

a rotating plate fixedly mounted on the rotating shaft and having a plurality of first slits and a second slit formed therein, the first and second slits being disposed on a circle around the axis of the rotating shaft, the first slits having substantially the same circumferential length and being circumferentially spaced from each other at substantially the same interval, the second slit being disposed near one of the first slits; and a photocoupler disposed near the rotating plate for generating an output signal when it senses that one of the first and second slits in the rotating plate passes a prescribed location during the rotation of the rotating plate.

Preferably, the second slit has a circumferential length less than that of the first slits. The second slit may be disposed rearwardly or forwardly of the one of the first slits in a prescribed rotational direction of the rotating shaft.

The above and other objects, features and advantages of the present invention will become more readily apparent from the ensuing detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

Figure 4:
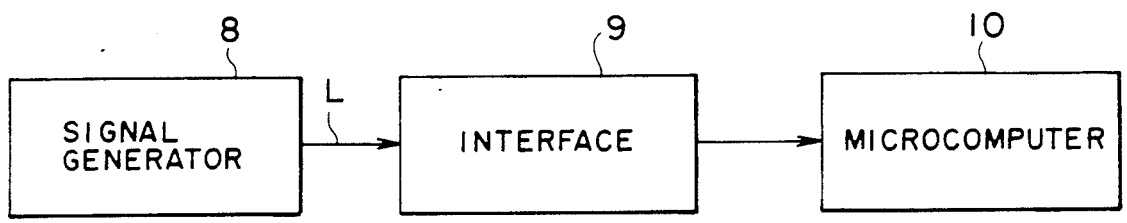
FIG. 4 is a schematic block diagram of a conventional cylinder recognition apparatus for a multi-cylinder internal combustion engine.

First, it should be understood that the general arrangement of a cylinder recognition apparatus for a multi-cylinder internal combustion is similar to that of the conventional one illustrated in FIG. 4. However, a signal generator, which is generally designated by reference numeral 108 in FIG. 1, is different in construction and operation from the conventional one as illustrated in FIG. 5.

Figure 1:
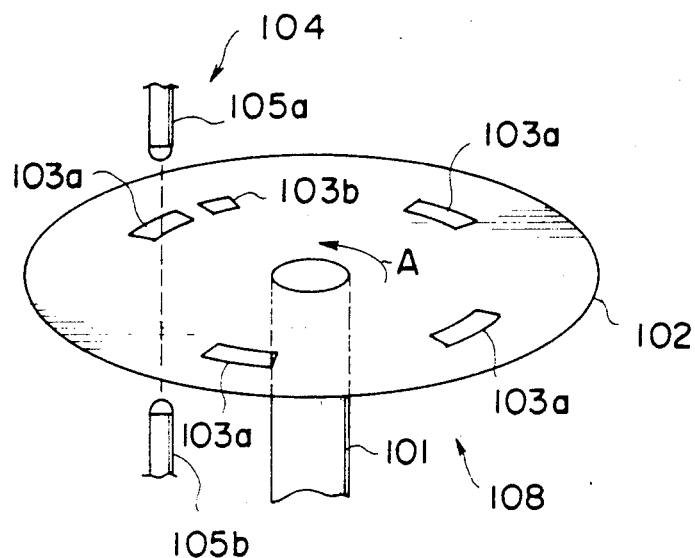
FIG. 1 is a perspective view schematically illustrating the arrangement of a signal generator according to the present invention.
Figure 5:
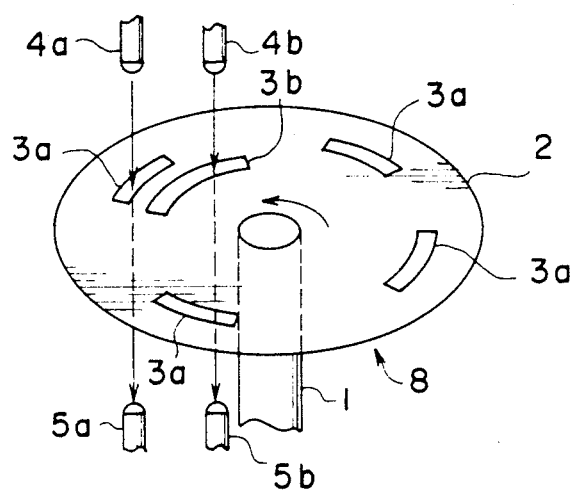
FIG. 5 is a perspective view illustrating the general arrangement of a conventional signal generator employed with the conventional cylinder recognition apparatus of FIG. 4.

More specifically, as shown in FIG. 1, the signal generator 108 of the present invention includes a rotating shaft 101 operatively connected with the crankshaft (not shown) of a multi-cylinder internal combustion engine, and a rotating plate 102 fixedly mounted on the rotating shaft 101, as in the conventional signal generator 8 of FIG. 5. The rotating plate 102 has a plurality of first slits 103a formed therein at locations circumferentially spaced from each other at equal intervals, each of the slits 103a relating to a corresponding cylinder of the engine. The first slits 103a are disposed on a circle around the axis of the rotating shaft 101 and have substantially the same circumferential length. A second slit 103b is formed in the rotating plate 102 at a location near a specific one (e.g., corresponding to a specific reference cylinder #1) of the first slits 103a. The second slit 103b is disposed on the same circle on which the first slits 103a are disposed. In the illustrated example, the second slit 103b is circumferentially spaced a prescribed limited distance from the specific one of the first slits 103a in a direction opposite the rotating direction of the rotating shaft 101. In FIG. 1, the second slit 103b is illustrated to have a circumferential length less than that of the first slits 103a, but the circumferential length thereof may be equal to or greater than that of the first slits 103a. However, it is preferable that the circumferential length of the second slit 103b be much shorter than that of the first slits 103a so as to simplify the cylinder recognition process which will be described later with reference to the flow chart of FIG. 3. In addition, the second slit 103b may be disposed such that it is circumferentially spaced from the specific one of the first slits 103a in a direction in which the rotating shaft 101 rotates.

A photocoupler 104 is provided near the rotating plate 102 for generating an output signal when it senses that one of the first and second slits 103a, 103b in the rotating plate 102 passes a prescribed location during the rotation of the rotating plate 102. The photocoupler 104 includes a single pair of light emitting diode 105a and a light sensor 105b in the form of a photodiode which are disposed on the opposite sides of the rotating plate 102 in alignment with each other on the circle on which the first and second slits 103a, 103b are disposed. The light sensor 105b generates an output signal in the form of a square pulse when it receives the light, which was emitted from the light emitting diode 104 and which passed through the first slits 103a or the second slit 103b, i.e., at the time when one of the slits 103a, 103b is placed in alignment with the light emitting diode 104 and the light sensor 105.

Figure 2:
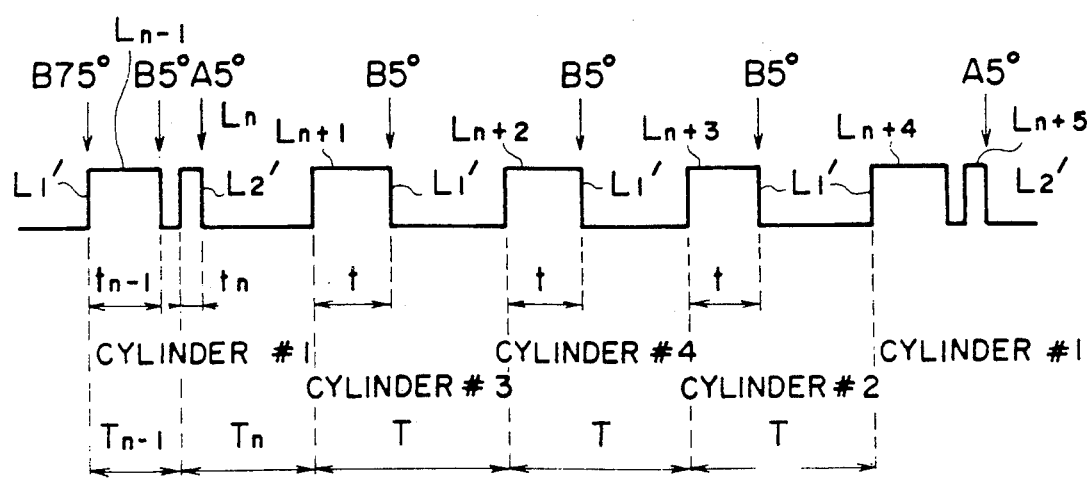
FIG. 2 is a waveform diagram of the output signal of the signal generator of FIG. 1.

Thus, as illustrated in FIG. 2, the output signal of the light sensor 105 includes a plurality of first or positional pulses L1' each in the form of a wide pulse relating to a corresponding first slit 103a and a second or cylinder recognition pulse L2' in the form of a narrow pulse corresponding to the second slit 103b. Each of the wide positional pulses L1' has a rising edge, which occurs at the leading edge of one of the first slits 103a (e.g., at the crank angle of 75 degrees before top dead center), and a falling edge, which occurs at the trailing edge thereof (e.g., at the crank angle of 5 degrees before top dead center). In the illustrated example, the narrow cylinder recognition pulse L2' follows a specific one of the wide positional pulses L1' corresponding to the specific reference cylinder, and has a rising edge, which occurs at the leading edge of the second slit 103b (e.g., slightly later than the falling edge of the specific one of the first wide pulses L1'), and a falling edge, which occurs at the trailing edge of the second slit 103b (e.g., at the crank angle of 5 degrees after top dead center).

Figure 6:
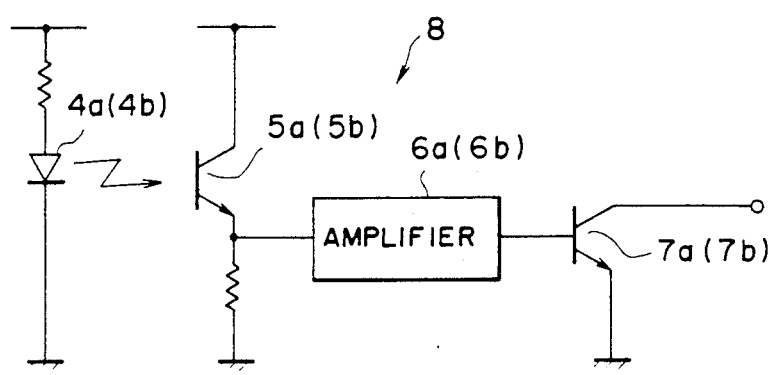
FIG. 6 is a schematic circuit diagram of the conventional signal generator of FIG. 5.
Figure 7:
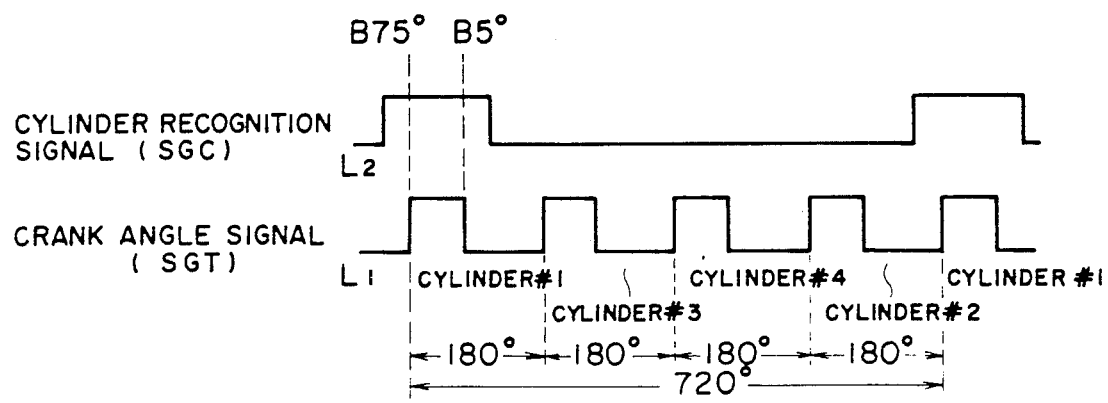
FIG. 7 is a waveform diagram of a crank angle reference signal $L_1$ and a cylinder recognition signal $L_2$.

The output signal of the signal generator 108 is amplified by an unillustrated amplifier and then fed to the base of an unillustrated output transistor which has the collector coupled to an interface circuit of a cylinder recognition means in the form of a microcomputer and the emitter grounded, as in the conventional cylinder recognition apparatus illustrated in FIG. 6.

The construction and operation of this embodiment other than the above are substantially similar to those of the conventional cylinder recognition apparatus as illustrated in FIGS. 4 through 7.

Next, the operation of this embodiment will be described in detail with particular reference to the flow chart of FIG. 3.

As the rotating plate 102 rotates in a direction indicated by arrow A in FIG. 1 in synchrony with the rotation of the engine, the light sensor 105b of the signal generator 108 generates an output signal including first pulses L1' and second pulses L2', as shown in FIG. 2. The microcomputer (not shown) receives via the unillustrated interface circuit the output signal of the signal generator 108, and processes it in the manner as shown in the flow chart of FIG. 7 in accordance with a control program stored therein.

Specifically, in Step S1, the length or pulse width t of each pulse L1' or L2' of the signal generator output signal as well as the period or pulse interval T between the rising edges of successive pulses are calculated so as to discriminate whether it is a positional pulse L1' or a cylinder recognition pulse L2'. In Step S2, the duty cycle t/T for each pulse is then calculated based on the pulse width t and the pulse interval T thus calculated. Subsequently, in Step S3, based on the duty cycle t/T thus calculated, the difference between the present or latest duty cycle data $(t/T)_n$ for the present or latest pulse $L_n$ and the preceding duty cycle data $(t/T)_{n-1}$ for the preceding pulse $L_{n-1}$ is calculated, and it is determined whether the absolute value of the difference $\{(t/T)_n - (t/T)_{n-1}\}$ is greater than a prescribed value $\alpha$. If $(t/T)_n - (t/T)_{n-1} > \alpha$ (i.e., the present or latest duty cycle $(t/T)_n$ for the present cylinder recognition pulse $L_2$ has greatly changed from the preceding duty cycle $(t/T)_{n-1}$ for the specific positional pulse $L_1$, e.g., the pulse width of a cylinder recognition pulse L₂ (i.e., the circumferential length of the second slit 103b) can be set to be much shorter than that of a positional pulse L1' (i.e., the circumferential length of the first slits 103a) ), then the program proceeds to Step S4 wherein the present pulse $L_n$ is determined to be a second pulse L2', and hence the specific reference cylinder #1 corresponding to the second pulse L2' is recognized or discriminated. Once the specific reference cylinder #1 is thus discriminated, it is automatically determined to which cylinders the succeeding pulses ($L_{n+1}$, $L_{n+2}$, . . . ) correspond since the operational order of the cylinders is predetermined. After the specific reference cylinder #1 has been recognized in this manner, a flag representative of the specific cylinder #1 is set in a register in the microcomputer, and the cylinder recognition process ends.

On the other hand, if it is determined in Step S3 that $(t/T)_n - (t/T)_{n-1} \leq \alpha$, the program immediately returns to the first Step S1, and the Steps S1 through S3 are then repeated until the specific cylinder #1 is recognized.

In this connection, in Step S3, instead of determining whether or not $(t/T)_n - (t/T)_{n-1} > \alpha$, the duty cycle t/T for each pulse L₁, L₂ can be compared with a prescribed value $\beta$, and if $t/T > \beta$, the pulse is determined to be a specific positional pulse corresponding to the specific cylinder #1. This is because the duty cycle t/T for a specific positional pulse is generally much higher than that for the other positional pulse or for a cylinder recognition pulse. On the other hand, in cases where the duty cycle t/T for a cylinder recognition pulse is set to be much lower than that for the positional pulses, it is possible to determine a pulse to be a cylinder recognition pulse if the duty cycle t/T for the pulse is less than a prescribed value.

After a cylinder recognition pulse L2' corresponding to the specific cylinder #1 has once been recognized in the above manner, it becomes possible to discriminate the respective remaining cylinders based on the subsequent positional pulses L1', so various engine operations such as ignition, fuel injection, etc., can be properly controlled based on the rising edge and/or falling edge of each positional pulse L1'. For example, ignition can be controlled such that the current supply to the ignition coil of the engine is cut off at the falling edge of each positional pulse L1' so as to properly control the ignition timing of a corresponding cylinder. In this case, however, when a specific positional pulse L1' corresponding to the specific cylinder #1 has not yet been discriminated or recognized, ignition is controlled to take place at the falling edge of each pulse L1' or L2' of the signal generator output pulse. If a cylinder recognition signal L2' follows shortly after the falling edge of a specific positional pulse L1', as clearly shown in FIG. 2, a first ignition will take place in the specific cylinder #1 at the falling edge (e.g., at 5 degrees before TDC) of a specific positional pulse L1' corresponding to the specific cylinder #1, but a subsequent ignition will not take place at the falling edge (e.g., at 5 degrees after TDC) of a cylinder recognition pulse L2' following the specific positional pulse L1' since the first ignition already took place shortly before the falling edge of the cylinder recognition pulse L2' and there is no sufficient voltage built up on the ignition coil during a short time between the falling edges (e.g., between 5 degrees before TDC and 5 degrees after TDC) of the successive pulses L1', L2'. To this end, it is necessary to set the cylinder recognition pulse L2' and hence the position of the second slit 103b in the rotating plate 102 in such a manner that the falling edge of the cylinder recognition pulse L2' is located sufficiently near to the falling edge of the preceding specific positional pulse L1' so as to prevent the build-up of a high voltage on the ignition coil during the period therebetween but remote from the rising edge of the following positional signal L1' so as to allow a high voltage to be developed during the time therebetween. As a result, there will be no problem of improper ignition or misfiring.

Here, it is to be noted that for the purpose of controlling engine operations such as fuel injection other than the above-mentioned ignition, a cylinder recognition pulse L2' may take place before a specific positional pulse L1' corresponding to the specific cylinder #1, i.e., between a specific positional pulse and the preceding positional pulse. In this case, too, the process for discriminating or recognizing a specific positional signal and hence the specific cylinder #1 is substantially the same as the aforesaid one as illustrated in the flow chart of FIG. 7.

Figure 3:
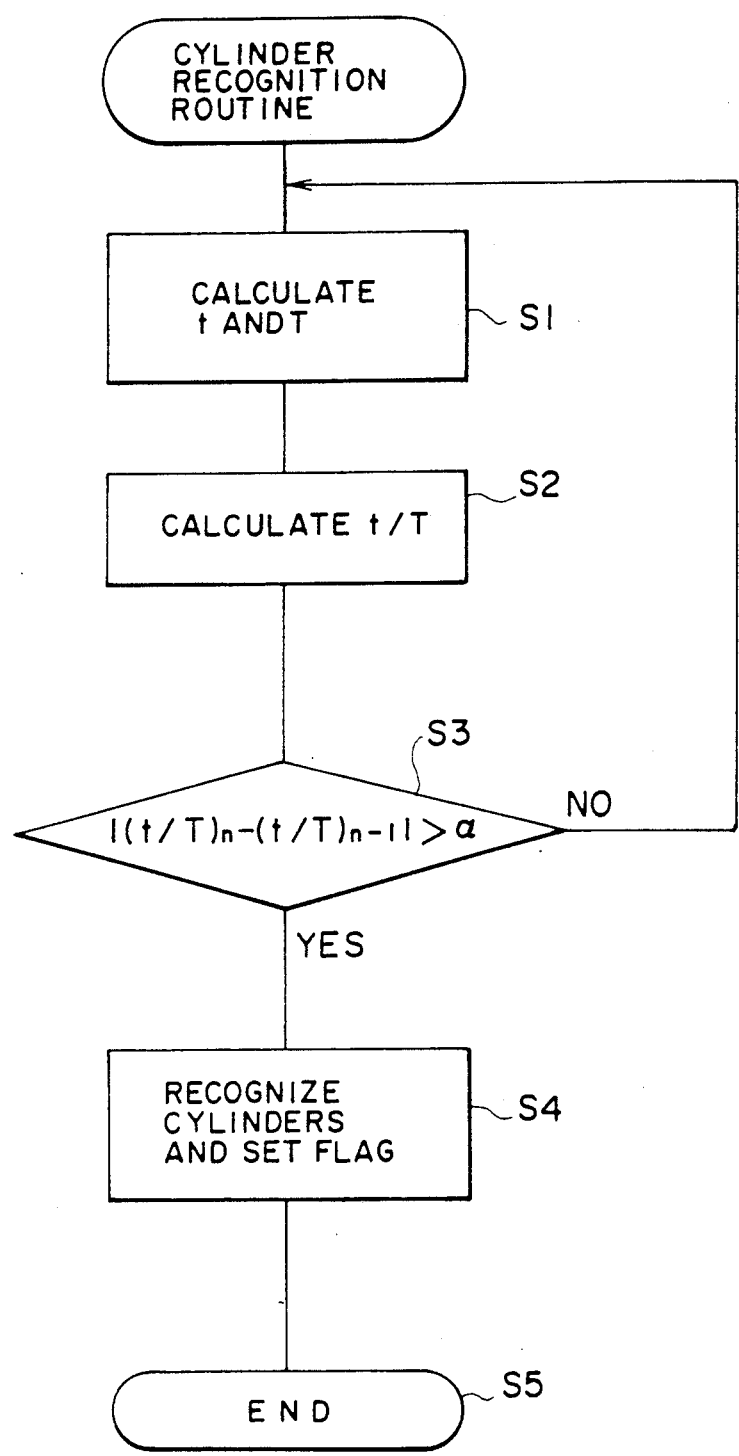
FIG. 3 is a flow chart illustrating the operation of a cylinder recognition apparatus for a multi-cylinder internal combustion engine equipped with the signal generator of FIG. 1 according to the present invention.

Although in the above embodiment, in Step S2 in FIG. 3, the duty cycle t/T for each pulse L₁ or L₂ of the output signal of the signal generator 108 is utilized for discriminating a specific positional signal corresponding to the specific cylinder #1, the ratio $t/(T-t)$ of the high-level to low-level period for each pulse L1', L2' may instead be employed. In this case, a change in the high-level to low-level period ratio $t/(T-t)$ between a positional signal L1' and a cylinder recognition signal L2' becomes greater than a change in the duty cycle t/T therebetween, so sensitivity in the discrimination or recognition of the specific cylinder #1 is accordingly improved.

What is claimed is:

1. A cylinder recognition apparatus for a multi-cylinder internal combustion engine comprising:
   a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder, the positional pulses being square pulses having substantially the same pulse width, each of the positional signals having a rising and a falling edge which correspond to a first and a second rotational position, respectively, of a corresponding cylinder, the cylinder recognition pulse being a square pulse having a rising edge and a falling edge, the cylinder recognition pulse having a pulse width different from that of the positional pulses; and
   cylinder recognition means for discriminating the cylinder recognition pulse among the pulses contained in the output signal of the signal generator so as to recognize the specific positional pulse corresponding to the specific cylinder.

2. A cylinder recognition apparatus as claimed in claim 1, wherein the cylinder recognition pulse in the signal generator output signal has a pulse width less than that of the positional pulses.

3. A cylinder recognition apparatus as claimed in claim 2, wherein the cylinder recognition pulse in the signal generator output signal follows the specific positional pulse.

4. A cylinder recognition apparatus as claimed in claim 2, wherein the cylinder recognition pulse in the signal generator output signal precedes the specific positional pulse.

5. A cylinder recognition apparatus as claimed in claim 2, wherein the cylinder recognition means calculates the pulse width of each pulse in the signal generator output signal and the pulse interval between the rising or falling edges of successive pulses, calculates the ratio of the pulse width to the pulse interval for each pulse, and discriminates the cylinder recognition pulse based on the ratio thus obtained.

6. A cylinder recognition apparatus as claimed in claim 2, wherein the cylinder recognition means calculates the pulse width $t_n$ of each pulse in the signal generator output signal and the pulse interval $T_n$ between the rising or falling edges of successive pulses, calculates the ratio $(t/T)_n$ of the pulse width $t_n$ to the pulse interval $T_n$ for each pulse and the difference between the present ratio $(t/T)_n$ for the present pulse and the preceding ratio $(t/T)_{n-1}$ for the preceding pulse, and compares the absolute value of the difference $(t/T)_n - (t/T)_{n-1}$ with a prescribed reference value $\alpha$, and determines the present pulse to be the cylinder recognition pulse if $(t/T)_n - (t/T)_{n-1} > \alpha$.

7. A cylinder recognition apparatus as claimed in claim 2, wherein the cylinder recognition means calculates the pulse width $t_n$ of each pulse in the signal generator output signal and the pulse interval $T_n$ between the rising or falling edges of successive pulses, calculates the ratio $(t/T)_n$ of the pulse width $t_n$ to the pulse interval $T_n$ for each pulse, compares the ratio $(t/T)_n$ with a prescribed reference value $\beta$, and determines a pulse to be the cylinder recognition pulse if the ratio $(t/T)_n$ for the pulse $< \beta$.

8. A cylinder recognition apparatus as claimed in claim 6, wherein the present ratio $(t/T)_n$ is substituted for by the present ratio $[t/(T-t)]_n$ of the pulse width $t_n$ to the difference $(T-t)_n$ between the pulse interval $T_n$ and the pulse width $t_n$ for the present pulse, and the preceding ratio $(t/T)_{n-1}$ is substituted for by the preceding ratio $[t/(T-t)]_{n-1}$ of the pulse width $t_{n-1}$ to the difference $(T-t)_{n-1}$ between the pulse interval $T_{n-1}$ and the pulse width $t_{n-1}$ for the preceding pulse.

9. A cylinder recognition apparatus as claimed in claim 7, wherein the ratio $(t/T)_n$ is substituted for by the ratio $[t/(T-t)]_n$ of the pulse width $t_n$ to the difference $(T-t)_n$ between the pulse interval $T_n$ and the pulse width $t_n$ for each pulse.

10. A cylinder recognition apparatus as claimed in claim 1, wherein the signal generator comprises:
a rotating shaft operatively connected with the engine for synchronized rotation therewith;
a rotating plate fixedly mounted on the rotating shaft and having a plurality of first slits corresponding to the respective cylinders of the engine and a second slit for recognition of the specific cylinder formed therein, the first and second slits being disposed on a circle around the axis of the rotating shaft, the first slits having substantially the same circumferential length and being circumferentially spaced from each other at substantially the same interval, each of the first slits having one edge corresponding to a first rotational position of a corresponding cylinder and the other edge corresponding to a second rotational position of the corresponding cylinder, the second slit being disposed near one of the first slits; and
a photocoupler disposed near the rotating plate for generating an output signal when it senses that one of the first and second slits in the rotating plate passes a prescribed location during the rotation of the rotating plate.

11. A cylinder recognition apparatus as claimed in claim 10, wherein the second slit has a circumferential length less than that of the first slits.

12. A cylinder recognition apparatus as claimed in claim 10, wherein the second slit is disposed rearwardly of the one of the first slits in a prescribed rotational direction of the rotating shaft.

13. A cylinder recognition apparatus as claimed in claim 10, wherein the second slit is disposed forwardly of the one of the first slits in a prescribed rotational direction of the 14. A signal generator comprising:
a rotating shaft;
a rotating plate fixedly mounted on the rotating shaft and having a plurality of first slits and a second slit formed therein, the first and second slits being disposed on a circle around the axis of the rotating shaft, the first slits having substantially the same circumferential length and being circumferentially spaced from each other at substantially the same interval, the second slit being disposed near one of the first slits and having a circumferential length different from that of the first slits; and
a photocoupler disposed near the rotating plate for generating an output signal when it senses that one of the first and second slits in the rotating plate passes a prescribed location during the rotation of the rotating plate.

15. A signal generator as claimed in claim 14, wherein the second slit has a circumferential length less than that of the first slits.

16. A signal generator as claimed in claim 14, wherein the second slit is disposed rearwardly of the one of the first slits in a prescribed rotational direction of the rotating shaft.

17. A signal generator as claimed in claim 14, wherein the second slit is disposed forwardly of the one of the first slits in a prescribed rotational direction of the rotating shaft.

18. A signal generator as claimed in claim 14, wherein the photocoupler comprises a light emitter and a light sensor disposed on the opposite sides of the rotating plate in alignment with each other, the light sensor being operable to generate an output signal when it receives the light which was emitted thereto from the light emitter and passed through one of the first and second slits in the rotating plate during the rotation thereof.

* * * * *